United States Patent
Ranganathan

(10) Patent No.: US 6,487,578 B2
(45) Date of Patent: Nov. 26, 2002

(54) DYNAMIC FEEDBACK COSTING TO ENABLE ADAPTIVE CONTROL OF RESOURCE UTILIZATION

(75) Inventor: Kumar Ranganathan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/940,388
(22) Filed: Sep. 29, 1997

(65) Prior Publication Data
US 2002/0147759 A1 Oct. 10, 2002

(51) Int. Cl.⁷ .................................................. G06F 9/00
(52) U.S. Cl. .................................................... 709/104
(58) Field of Search ................................ 709/100, 102, 709/104

(56) References Cited

U.S. PATENT DOCUMENTS

| | | | |
|---|---|---|---|
| 5,682,530 A | * 10/1997 | Shimamura | 709/104 |
| 5,761,091 A | * 6/1998 | Agrawal et al. | 702/186 |
| 5,826,083 A | * 10/1998 | Prasad | 709/105 |
| 5,838,968 A | * 11/1998 | Culbert | 709/104 |
| 5,878,258 A | * 3/1999 | Pizi et al. | 709/302 |
| 6,003,061 A | * 12/1999 | Jones et al. | 709/104 |
| 6,026,362 A | * 2/2000 | Kim et al. | 705/1 |

\* cited by examiner

Primary Examiner—Zarni Maung
Assistant Examiner—George L. Opie
(74) Attorney, Agent, or Firm—Blakely, Sokoloff, Taylor & Zafman LLP

(57) ABSTRACT

An adaptive resource utilization apparatus for an application. The apparatus includes a costing subsystem engine configured to measure resource utilization of application-defined subsystems within that application as well as a feedback mechanism configured to interface the application to the costing engine. The application is enabled to modify its operating parameters based on resource utilization of its individual subsystems as presented to the application by the feedback mechanism.

25 Claims, 6 Drawing Sheets

*QOS = Quality of Service

DYNAMIC FEEDBACK COSTING TO ENABLE ADAPTIVE CONTROL OF RESOURCE UTILIZATION

BACKGROUND OF THE INVENTION

1. Field of the Invention

The invention relates generally to the field of microprocessors. More specifically, the invention relates to operating system policy regarding the utilization of microprocessors.

2. Description of the Related Art

PC (Personal Computer) based applications, such as videoconferencing that involve heavily multimedia (audio, video and data) streams which must be simultaneously processed, place heavy demands upon the processor and resources of the platforms where these applications are executed. In addition to their appetite for processing power, these applications must execute in real-time, i.e., the multimedia processing must occur in tightly constrained time intervals. More recently, desktop personal computers have used true demand-paged multi-tasking operating systems (such as Windows NT™) wherein both multimedia applications and third party applications (other than multimedia, such as a spreadsheet) vie and contend for key system resources such as processor "bandwidth" (referring to the amount of computational resource utilized per unit time) and memory. Where a third party application (an application other than multimedia) and the multimedia application so contend, two situations arise: (1) the third party application will take resources away from the multimedia application causing the multimedia application to be unable to meet its real-time deadlines for a desired quality of service (QOS) and/or (2) the third party application will execute sluggishly and nonresponsively and may be "starved" by the multimedia application for the computational resource.

Operating systems are ordinarily designed to distribute system resources evenly by preventing the monopolization of resources by one application to the exclusion of others. Most commercial operating systems for desktop PCs are not designed to accommodate real-time applications specifically, but rather, are designed to allocate resources without regard to any real-time constraints by a particular application. Real-time multimedia applications that are sensitive to latency are becoming more and more prevalent and will only increase with the advent of innovations such as the Intel Pentium Processor with MMX Technology™ (having special instructions geared toward the processing of multimedia). The emergence of videoconferencing transmission standards, broadband data delivery and high-bandwidth information pathways will additionally serve to increase the use of multimedia applications. The increased load on microprocessors and system resources due to the widening use of applications will not be appropriately accounted for by operating system policy. Commercial operating systems are by necessity targeted to a broad base of applications of different types, and favors fairness and resource use equalization between applications.

Because an operating system is designed to execute a broad range of application with widely differing usage characteristics, it is very difficult to tailor a commercial shrink-wrapped desktop operating system to the needs of any particular application. Rather, it is more feasible for individual applications to be able to control the individual resources being consumed in response to contention for system resources by other applications. This will allow such an application to consume heavily when there is no contention and voluntarily consume less when there is contention.

Currently, there is no practice for allowing applications to modify their own operation depending upon their utilization of system resources. Further, though an operating system may compute resource utilization by application, it does not compute, load or utilization for the individual and subsystems of running applications. Operating systems do track utilization of threads. However, they have no knowledge of the internal structure of applications that are multi-threaded. If an application is partitioned into a number of subsystems with each subsystem consisting of several distinct threads, current operating systems provide no mechanism to back the processor utilization of individual subsystems. Further, there is no mechanism for meaningfully presenting and packaging statistics related to load to an application such that the application can intelligently respond by modifying its operating parameters. Traditional operating system costing does not allow for distinguishing between short-term transient aberrations and long-term utilization trends which meaningful statistics would provide. The most effective and efficient way of utilizing available resources is to allow application to control the operating parameters of their own threads and subsystems based on dynamic-statistical feedback of and estimates (costing metrics) of resource utilization.

There is a need for providing costing metrics to applications to allow the application to modify its operation to more effectively respond to contention for system resources by other applications running concurrently.

SUMMARY OF THE INVENTION

What is disclosed is an adaptive resource utilization apparatus for an application. The apparatus includes a costing subsystem engine configured to measure resource utilization of application-defined subsystems within that application as well as a feedback mechanism configured to interface the application to the costing engine. The application is enabled to modify its operating parameters based on resource utilization of its individual subsystems as presented to the application by the feedback mechanism.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

DEFINITIONS

The definitions below are in reference to specific concepts and elements presented in various embodiments of the invention and are not intended to convey general meanings in the art, and are merely illustrative to aid in understanding various embodiments of the invention.

"costing", "costing metrics"—measure(s) of a resource utilization extracted from information provided by operating system, kernel, shell and other well known application environments. Costing may refer to I/O, bus or memory utilization, but refers primarily to the utilization of a CPU (central processing unit) or similar data processing circuits by one or more executed code sequences.

"QOS"—Quality of Service—refers to the level of quality delivered by an application with respect to data processed and output by that application. For instance, in a videoconferencing application, a QOS measure would include the video frame rate delivered to the display device or the resolution of the image.

"thread"—a unit of execution schedulable by an operating system scheduler. The thread is an atomic unit upon which costing information can be obtained.

"Costing Coefficient (ρ)"—the percentage of resource (processor) utilization in a defined time period ΔT (also referred to as the "costing interval"). For a particular set of N threads 1, 2, 3, . . . N their respective costing coefficients are represented by $\rho_1, \rho_2, \rho_3, \ldots \rho N$ For each thread, the costing coefficient is computed as the actual processor time accrued by the thread divided by the costing interval ΔT. Not all threads existent in a system are necessarily "active" (accruing non-zero processor time), but of all threads M which do accrue processor time, the costing coefficients of those M threads will sum to 1. However, in certain instances, an idle thread, merely by allocation, may occupy a non-zero resource utilization.

Figure 1:
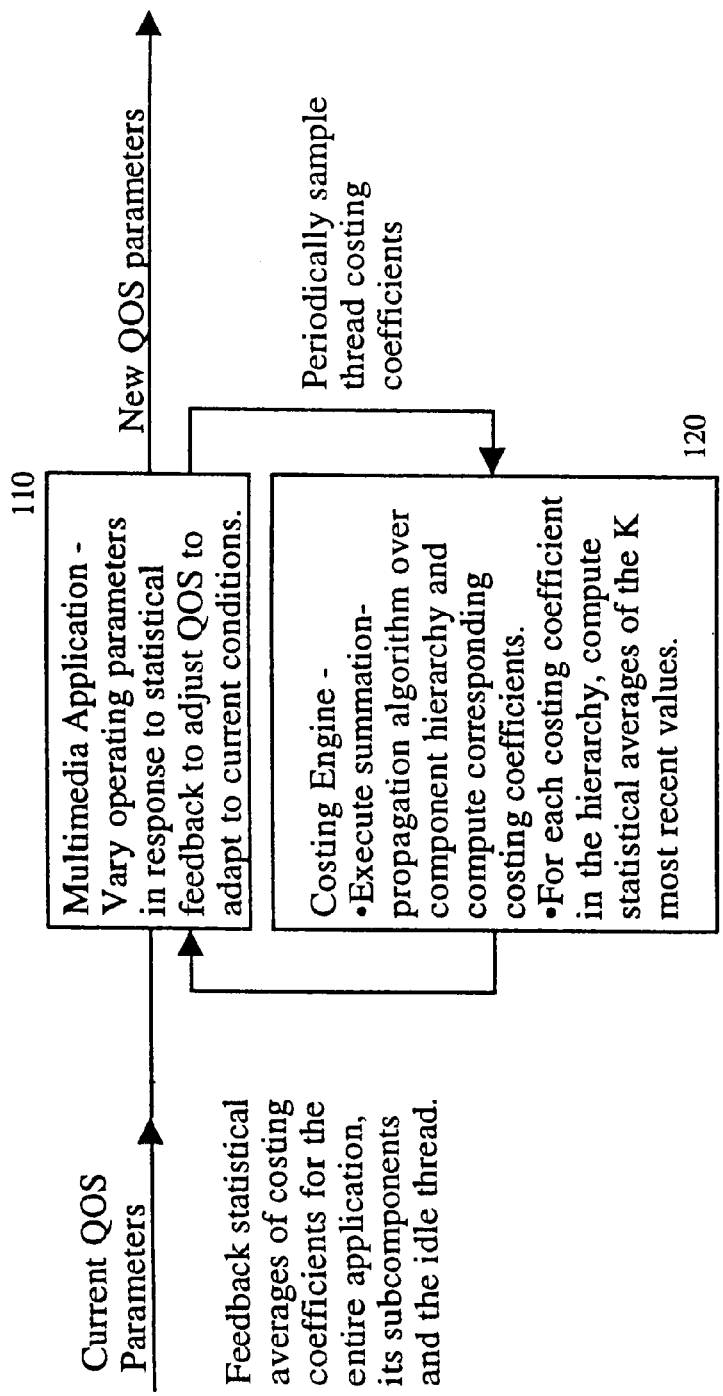
FIG. 1 shows a system level diagram of costing according to one embodiment of the invention.

FIG. 1 shows a system level diagram of costing according to one embodiment of the invention.

A multimedia application 110 configures itself (by using codecs, algorithms, or modifying the same) to deliver a certain Quality of Service or QOS (possibly defined by the user). For instance, where multimedia application 110 is a videoconferencing application, the user may desire to have a view screen of a certain resolution while maintaining an acceptable frame rate. This QOS parameter induces the multimedia application 110 to modify the window size and effect some changes to the codec or to pixel properties (e.g., reduce the number of colors) to deliver the desired resolution.

In prior art operating system environments, an application's QOS parameters, while modifiable by user choice, cannot dynamically adapt to operating environment and hardware utilization by the application and its threads and to contention for hardware resources by other unrelated applications. A "thread" is the smallest unit of schedulability at the operating system abstraction level. While costing metrics are maintained on a thread level by the operating system, no costing information is maintained on a per-subsystem level for every subsystem in the application.

Figure 2:
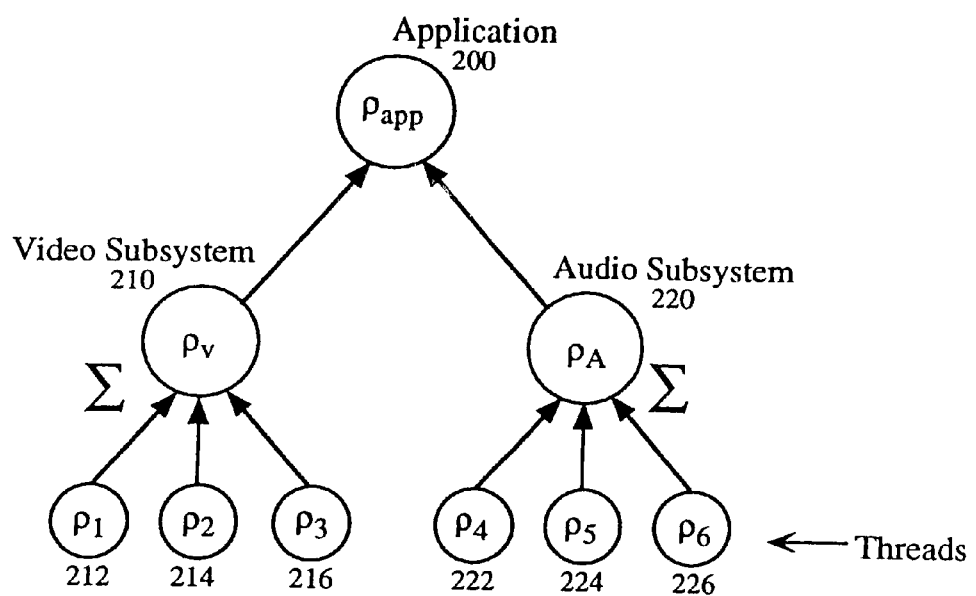
FIG. 2 illustrates the hierarchical partitioning of an application into logical subsystems that in turn consist of one ore more threads.

Thus, the invention in one embodiment provides for subsystem level costing metrics to be dynamically computed and presented to applications such as multimedia application 110, so that the application can dynamically adjust its operation and execution to current conditions of the operating environment (e.g., processor load). In this regard, FIG. 1 also shows a costing engine 120 which feeds back costing metrics on-the-fly to multimedia application 110 so that multimedia application 110 can vary dynamically its QOS parameters. This embodiment of the invention shows how the costing engine periodically samples and computes statistical costing information for the application's individual subsystems. The costing engine 120 computes the costing coefficient of application 110's individual threads via periodically querying the operating system for individual thread utilization. Costing engine 120 then converts these thread costing coefficients into higher level subsystem costing coefficients via a summation and propagation algorithm as shown in FIG. 2. In addition to computing these subsystem level costing coefficients, costing engine 120 also computes statistical averages such as the mean and standard deviation of each of these coefficients and feeds them back on-the-fly to its client application 110.

In FIG. 1, costing engine 120 uses certain statistical and arithmetic and algorithms to compute statistical averages of costing coefficients that multimedia application 110 and other applications can utilize. These algorithms are detailed below. By examining the statistical information provided to it by costing engine 120, the multimedia application 110 can then automatically vary its operating parameters to adjust the QOS to current conditions. Application 110 will then be able to deliver the most efficient QOS based on operating environment conditions. The new QOS parameters are utilized until statistically averaged costing metrics impel the need for further change by application 110. Thus, the invention provides for a dynamic method and apparatus for application control down to a thread or subsystem level of abstraction based on resource utilization. These procedures, client notification, costing and client policy are described below in mechanisms that implement in various embodiments the overall scheme shown in FIG. 1.

FIG. 2 illustrates the hierarchical partitioning of an application into logical subsystems that in turn consist of one ore more threads.

An application 200 shown in its:hierarchical form in FIG. 2 consists of two components: a video subsystem 210 and an audio subsystem 220. Moving down the hierarchy, the video subsystem 210 consists of a plurality of video threads 212, 214 and 216. Likewise, audio subsystem 220 is composed of a plurality of audio threads 222, 224 and 226. The number of threads may vary from instant-to-instant, and represents a mere example of a snapshot in time of the execution of application 200 in the operating environment.

A costing coefficient $r_{app}$ for application 200 is an aggregate of the costing coefficients for video subsystem 210 and audio subsystem 220, shown as $\rho_V$ and $\rho_A$, respectively. The application costing coefficient $\rho_{app}$ is the total resource utilization (as resource is defined for the metric) of the entire application, its processes, and threads. In the exemplary diagram of FIG. 2, the costing coefficient $\rho_{app}$ is shown to be an aggregate of $\rho_V$ and $\rho_A$. Thus, $\rho_{app} = \rho_V + r_A$. FIG. 2 also shows that $\rho_V = \rho_1 + \rho_2 + \rho_3$ (the aggregate utilization of three video threads equals the utilization of the video subsystem) and $\rho_A = \rho_4 + \rho_5 + \rho_6$ (as the aggregate utilization of three audio threads equals the utilization of the audio subsystem). Thus, $\rho_{app} = \rho_1 + \rho_2 + \rho_3 + \rho_4 + \rho_5 + \rho_6$ (the application utilization is the aggregate of the utilization of all threads).

Thus, if a mechanism existed to compute the costing coefficient of individual threads, subsystem level costing coefficients could be computed via summation propagation. In commercial PC operating systems, such as Windows 95 and Windows NT, it is possible to query the base operating system for the Cumulative Processor Time (CPT) accrued by an individual thread from the time of its creation until the time of the query. Thus, the value of the CPT is a monotonically increasing function of time, of varying slope, whose derivative at any instant provides the instantaneous processor utilization of that thread at that instant. The thread costing coefficient can be defined over sampling period $\Delta T = t_2 - t_1$. If the CPT at each instant $t_2$ and $t_1$ is $CPT_2$ and $CPT_1$, respectively, the $\rho$, the thread costing coefficient over that interval is $\rho = (CPT_2 - CPT_1)/\Delta T$.

The diagram of FIG. 2 illustrates several useful features of costing as defined in various embodiments of the invention. First, the atomicity of a thread allows every component, subcomponent, sub-subcomponent of every application to be represented by an aggregate of threads. Atomicity of threads allows the costing coefficients to be propagated through the hierarchy so that for each higher level of abstraction (components, subsystems, etc.) aggregate costing coefficients can be maintained. The propagation of costing coefficients from a lower level of the three to the higher levels allows independent control by the application of parameters for components represented by each of those levels. Further hierarchical control can be combined from application-to-application, allowing the video subsystem costing of application A to be combined with the video subsystem costing of application B to attain an aggregate of video subsystems being executed by the operating environment. Likewise, certain threads in different applications can be identified and their costing coefficients combined. Propagation and aggregation allow for more meaningful statistics to be provided to the application for more granular and precise control of operating parameters based on thread and subsystem resource utilization.

Figure 3:
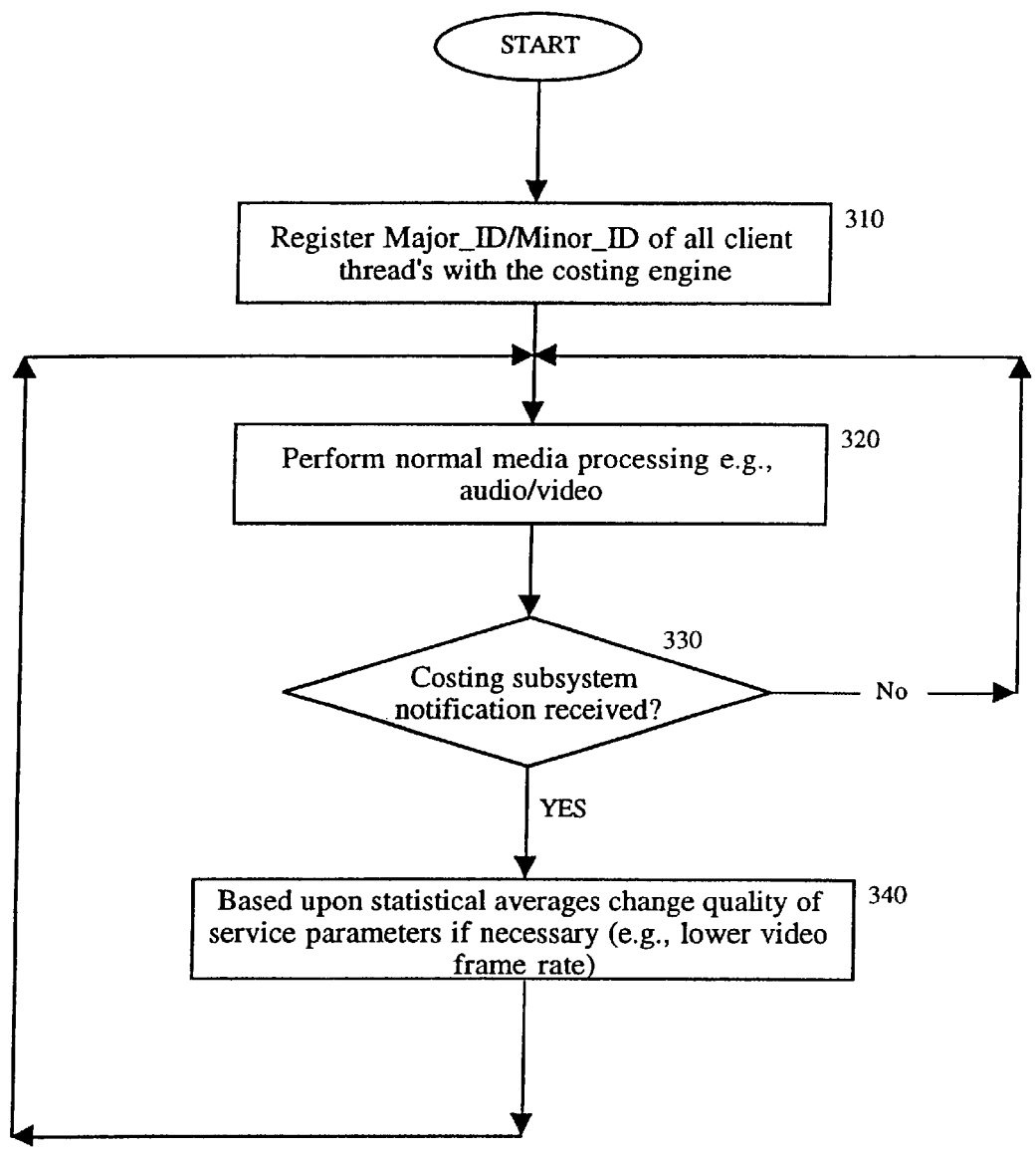
FIG. 3 is a flow diagram of an exemplary client policy algorithm according to one embodiment of the invention.

FIG. 3 is a flow diagram of an exemplary client policy algorithm according to one embodiment of the invention.

A client such as videoconferencing application will ideally have a set policy by which it can modify its operating parameters. One such exemplary client policy is shown in FIG. 3. First, according to step 310, the client's threads must be registered with the costing subsystem engine. By registering threads, the costing subsystem engine will be initialized to record and compile metrics for those threads for presenting them to the client. One way of implementing the registration process so that threads can be hierarchically classified into subsystems that they service (as shown in FIG. 2) is to utilize ID (identification) values such as Major_ID/Minor_ID which is further described below.

When all threads have been registered for a particular client, normal media processing can be performed (step 320) (e.g., processing of audio and video). "Normal" media processing refers to an operating parameter state of the application that has not received a "notification" from the costing subsystem engine. The notification signals to the application that new statistical averages and other such indicators are being forwarded to it by the costing subsystem.

The policy algorithm includes a test for receipt of notification from the costing subsystem (step 330). If no notification is received, normal media processing according to the current QOS/operating parameters continues to be performed. If a notification is received then the application may change its operating/QOS parameters if necessary based upon received resource metrics such as statistical averages of costing coefficients (step 340).

The above policy can be implemented for every client individually or even across clients for a particular subsystem of threads (e.g., video) that is being executed in the operating environment. Further, as discussed below, the registration and hierarchical nature of the costing coefficient allows threads of one subsystem to have operating/QOS parameters modified while maintaining in the previous state the parameters related to threads of another subsystem.

Figure 4:
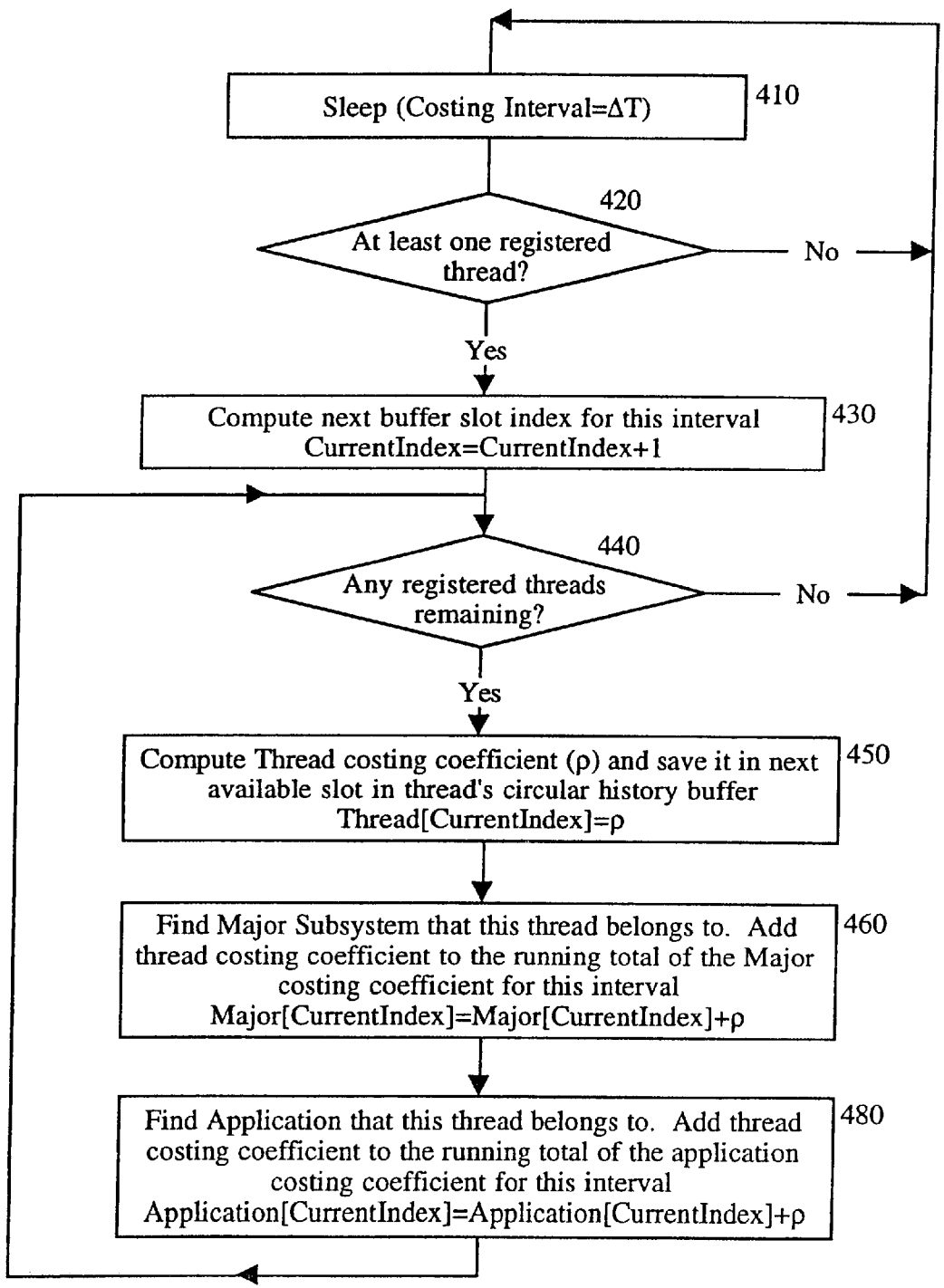
FIG. 4 is a flow diagram of the costing algorithm executed by the costing engine according to one embodiment of the invention.

FIG. 4 is a flow diagram of the costing algorithm executed by the costing engine according to one embodiment of the invention.

This algorithm is executed by the costing engine with a period $\Delta T$. Costing the threads of a client or of multiple clients involves several logical and mathematical steps. One function of costing is to provide statistical averages of costing coefficients to the client so that the client can make correct inferences about the current state of the system enabling it thereby to make correct decisions about changing the current QOS to a new one. As an example, the application may need to distinguish transient patterns of system utilization from steady-state patterns before making a decision to modify the QOS. The providing of costing coefficient may be achieved by an appropriate API (Application Programming Interface) which can interface with the client application being notified.

According to step 410, a sleep ($\Delta T$) function controls the periodicity of the costing engine. The sleep function is invoked for a period equal to the costing interval $\Delta T$ as defined above. This period $\Delta T$ is the time period over which the costing coefficients are computed and is referred to as the "costing interval". Every costing coefficient $\rho_1, \rho_2, \rho_3 \ldots \rho_V, \rho_A$ and $\rho_{app}$ (see FIG. 2) is associated with a unique circular buffer where its value is stored in the next available slot. The next available slot is identified by the "CurrentIndex" (step 450, FIG. 4). With every costing interval, the CurrentIndex of all the circular buffers progress forward in lock step. Step 440 indicates that for every costing interval, the costing engine cycles through the list of currently registered threads computing the costing coefficient of each and hierarchically propagating its value up the subsystem hierarchy of which it is a part.

Once an individual costing coefficient p, has been computed, the costing coefficient for the Major subsystem to which the thread belongs is increased by $\rho$ (step 460). This yields the most efficient way to aggregate the subsystem costing coefficient. Next, if the thread belongs also to a Minor subsystem, then the computed costing coefficient is added to the current value of the costing coefficient of the Minor subsystem (step 470). Finally, the application to which the thread belongs is identified, and that application's costing coefficient is also increased by the thread costing coefficient $\rho$. The process repeats and when the next costing interval ($\Delta T$) has expired, a thread's costing coefficient for the next interval can be computed and saved in a new buffer slot (step 450).

Figure 5:
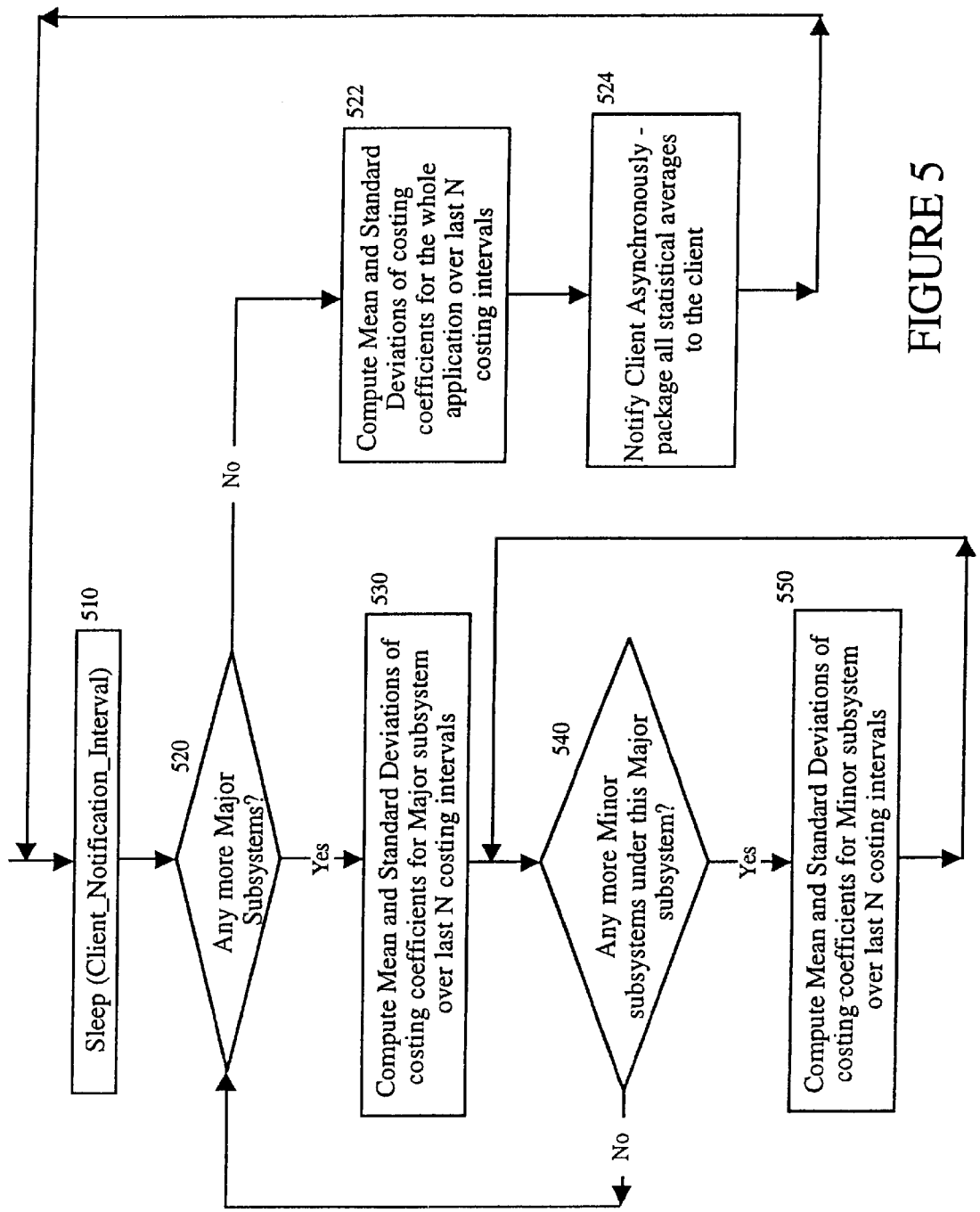
FIG. 5 is a flow diagram of a client notification algorithm according to one embodiment of the invention.

FIG. 5 is a flow diagram of a client notification algorithm according to one embodiment of the invention.

A client notification algorithm is illustrated in the exemplary embodiment of FIG. 5, but one skilled in the art will readily be able to adapt the algorithm to provide different levels and manner of statistical measures. The client notification algorithm is executed by an independent thread within the costing subsystem engine.

The first step is to execute a sleep or delay for a period of time equal to the client notification interval (step 510). The client notification interval depends upon the client's requirements and can be set by the client's program but is always greater than the costing interval $\Delta T$. The client can also specify to the costing engine how many historical values of the costing coefficients should be considered in the statistical computation.

The compiling of statistics is performed for all registered Major subsystems, Minor subsystems as well as the entire application (steps 520, 540 and 522), then the mean and standard deviations of all costing coefficients can be calculated over N costing intervals (steps 522, 530 and 550). Referring back to FIG. 4, this equates to using as input values the Major[k] costing coefficient values where k=j−N to j. If K is the CurrentIndex of the circular buffers and there are N slots in each circular buffer then there are N−1 historical values for the costing coefficient.

As an example, for a given major subsystem, if the client wants the last J coefficients where $1 \leq J \leq N$, the mean is computed as follows:

$$\text{if } J > k: \quad \left(\sum_{i=k-J+1}^{k} Major[i]\right) / J,$$

$$\text{else if } J > k: \quad \frac{\left(\sum_{i=N-(J-k)+1}^{N} Major[i] + \sum_{i=1}^{k} Major[i]\right)}{J}$$

While the mean is a good estimate of average value, it does not provide insight into the variation of the costing coefficient over the last "J" costing intervals. The standard deviation, however, does provide such a statistical estimate of the variation of the costing coefficient. For every Major subsystem, Minor subsystem and for the whole application, the costing engine computes the mean and standard deviations of its corresponding costing coefficients. In particular, the client can use the standard deviation to distinguish between transient loads and steady state trends and can respond appropriately in each case. For every Major subsystem, if there are any Minor subsystems (checked at step 540), then the mean and standard deviations of costing coefficients for the Minor subsystems are computed (step 550). When all Minor subsystems for a Major subsystem are processed, the algorithm returns to step 520 to check if any more Major subsystems exist. If no Major subsystems remain to be processed, then the costing subsystem computes the mean and standard deviations of the costing coefficients for the entire application for the last N costing intervals (step 522). Using the API or other similar programming structures, the client is then notified of all statistical averages (step 524). When the next client notification interval has expired, the algorithm proceeds again to check for the existence/remainder of Major Subsystems (step 520).

The algorithm of FIG. 5 is a policy for notifying the client application of the statistical averages for the Major and Minor Subsystems so that the client may self-modify operating parameters based upon these values.

Figure 6:
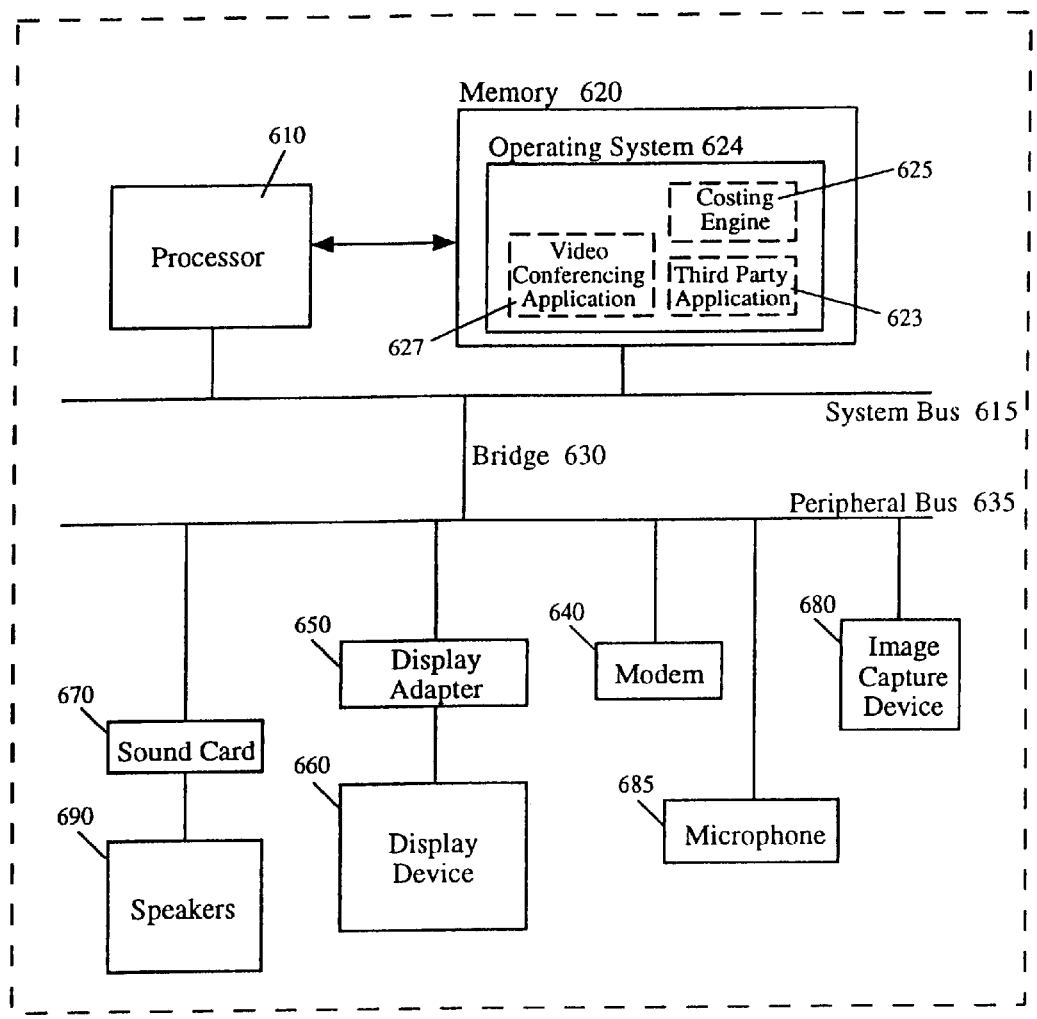
FIG. 6 is a system diagram according to one embodiment of the invention.

FIG. 6 is a system diagram according to one embodiment of the invention.

A computer system 600 may be any general purpose information device such as a desktop personal computer (PC). The components of computer system 600 are exemplary of an information device capable of executing, among a wide variety of other applications, multimedia applications such as videoconferencing.

Computer system 600 has a system bus 615 and a peripheral bus 635 which are coupled together via a bridge 630. The bus-bridge-bus design of FIG. 6 is merely exemplary and can be otherwise implemented depending on the desired design/complexity of the computer system 600. Memory 620 and processor 610 may be coupled directly with each other and to system bus 615 to transfer instructions, data and control information between each other and among other devices resident on computer system 600. Peripheral bus 635 couples to computer system 600 the following well-known devices: an image capture device 680 such as a digital camera, a modem 640, a display adapter 650 such as a video card, a display device 660 such as a monitor, a sound card 670 and speakers 690. The above peripheral devices will not be described in detail so as not to obscure the invention, and are well-known in the art.

When applications are executed on computer system 600, typically underlying all of them, is one or more operating system(s) (OS) or other operating environments such as a system kernel. FIG. 6 illustrates an operating system 624 that is resident in memory 620. The operating system interfaces together applications with other peripheral devices such as the modem 640, but also provides an interface for accessing processor 610 to execute instructions generated from applications and to return result data to the applications. Though the operating system is a layer upon which applications are executed, the operating system itself is an "application" being executed by the processor 610. However, unlike other applications, the operating system is a singular foundation for accessing peripheral devices, managing system resources and most importantly for providing at least rudimentary user interface mechanisms. One popular example of an operating system is Windows NT™ from Microsoft Corporation. Among other applications shown running over the operating system 624 are a costing engine 625 which, according to various embodiments of the invention, provides thread-based hierarchical costing metrics in the form of statistical averages to other applications so that other applications may modify operating parameters to efficiently account for usage of resources.

One such other application is a videoconferencing application 627 that facilitates the capture/encoding/compression of multimedia (audio/video) data that is destined for another computer system while concurrently displaying and outputting multimedia data originating external to computer system 600. Videoconferencing application 627 is illustrated as a module of instructions and data structures resident in memory 620. Likewise, FIG. 6 shows a third-party application 623 such as a spreadsheet which is being executed in memory concurrently with videoconferencing application 627. Further, according to this embodiment of the invention, a costing engine is provided that presents costing information to either of the applications 623 or 627. The costing engine may behave as described with reference to the methodology of FIGS. 3–5 above. The instructions for processing image and other data provided by videoconferencing application 627 are executed by a processor 610 such as the Pentium w/MMX technology from Intel Corporation. Audio data, such as voice, can be passed to the videoconferencing engine through a microphone 685. Audio, video and other data are processed in application 627 according to well-known codecs (compression/decompression algorithms) for transfer and/or storage. Additionally, third-party application 623 and/or other applications may be requesting the processing of instruction and data via processor 610.

The processing of data through videoconferencing application 627, exerts a load or utilization upon resources such as the processor. Third-party application 623 may also exert such a load. Costing engine 625 measures this load thread by thread, and if videoconferencing application 627 provides information about the functional hierarchy of its operation, and which threads belong to which component of the hierarchy, costing engine 625 can measure by subsystem the utilized load. Costing engine 625 measures the utilization of processor 610 and/or other system resources such the system bus in certain costing interval. Costing engine 625 issues instructions executed by processor 610 to perform summation, propagation and statistical averages on costing data stored in memory 620.

Videoconferencing application may have a video subsystem and an audio subsystem, which are functionally defined as shown in FIG. 2. If threads are so registered and identified, costing metrics may be obtained for the video subsystem as a whole. Then, the operating parameters such as frame rate or resolution can be modified by videoconferencing application 627 itself. This will modify the QOS for the application and change the manner in which video or image data is transferred to display adapter 650 for output on display device 660 or audio data is sent to sound card 670 for processing and then output to speakers 690. The manner by which costing metrics and statistical averages may be presented to application 627, and the manner in which the costing engine 625 interacts with operating system may be governed via an API (Application Programming Interface).

API MODEL

The Costing Engine may be implemented to run concurrently with an application (but should itself accrue minute processor time and impose anything but the slightest load) and to periodically execute summations recursively through the "subsystems" of an application. Though the costing engine can be implemented as a part of the operating system, it is best understood as a stand-alone add-in to existing operating systems. In the Windows™ family of operating systems, the communication of data from one application to another is achieved an API (Application Programming Interface). The API for the costing engine may be implemented via any interprocess communication mechanism including Remote Procedure Call (RPC).

As illustrated below in FIG. 3, every thread in the application which is undergoing costing by the costing engine must first register with the costing engine and provide identifying information to place the thread by its function into a hierarchy (see FIG. 2) for the application. This identifying information allows the server to constitute the threads into appropriate subsystems or components of the application. The API call "Register_Thread" governing the registration process, in one embodiment, would consist of the following parameters: ApplicationID, Major_ComponentID, Minor_ComponentID, Thread_ID, Notification_Interval, History Count. These parameters serve to provide a framework wherein the costing engine, application and operating system can communicate costing data.

In this model, the registering thread identifies itself via its "Thread_ID" and indicates to the costing engine that it is part of a particular subcomponent "Minor_ComponentID". which in turn is part of a component "Major ComponentID". Components are referred to throughout in various portions of the above description as subsystems whose names denote functions they perform, e.g., video subsystem. This information will enable the costing server engine to correctly propagate this Thread_ID's costing coefficients along the (Minor_ComponentID, Major_ComponentID) pathway in the application's overall hierarchy (e.g., FIG. 2). The costing coefficient of the component Major_Component_ID will be the propagated sum of the costing coefficients of all threads that identify themselves as belonging to that component. Likewise, the costing coefficient of all threads of the subcomponent Minor_Component_ID is the sum of all threads that identify themselves as belonging to that subcomponent. One or more Minor_Component_ID components may comprise a Major_Component_ID components make-up the client or application. In reference to FIG. 2, Major components (subsystems referenced by Major_Component_ID) would include the video subsystem and the audio subsystem. Though Minor components (referenced by Minor_Component_ID) are not shown, such components would reside on a level of the tree between the threads and Major components. Minor components for the video subsystem may include a compression component and a decompression component. Note that in the example of FIG. 2, the number of levels in the application's hierarchy has been arbitrarily chosen to be two, yielding 2 major subsystems. However, the API model permits by use of more identification structure on any number of desired hierarchical levels. Thus, a flexible API model can closely match costing coefficient hierarchy to the application's natural execution structure and modularity. The greater the number of levels, the more pinpoint control can be available for operating parameters. Each component (minor or major) can be individually monitored, and its operating parameters modified to cope with resource utilization.

The Notification_Interval parameter informs the costing engine the rate at which the application/client desires feedback of costing information. Finally, the HistoryCount parameter informs the costing engine how many past values of a costing coefficient should be considered when calculating the statistical mean and standard deviations for the costing coefficient for every component or thread. These statistical averages are included in the information that is a dynamically fed back to the application/client through the data structure defined by the API. In particular, the standard deviation of a costing coefficient allows the application to determine the level of variation in the value of a costing coefficient in the last HistoryCount number of costing intervals. This allows applications to distinguish short-term transients from long-term trends. Without such information, the application/client might react prematurely to short-term transient phenomena, resulting in highly oscillatory behavior. Based on a threshold standard deviation, the application/client can decide if operating parameters are to be modified, and if so, to what extent. By comparing statistical means of costing coefficients, the application can distinguish steady-state patterns of resource utilization from short-term transients.

In addition, the application/client may register a single handler routine that handles all notifications from the costing engine via the following API: InstallHandler(Application_ID, Handler_Proc). The costing engine periodically notifies the application about its various costing coefficients via the install handler.

In this manner, the application/client can now quantitatively determine exactly how much processor (or resource) utilization each of its threads, subsystems, or the application as a whole accrued over the most recent period and over a historical number of past costing intervals (via the statistical mean and standard deviation). It is also possible for the multimedia application to detect contention for the processor by other unrelated applications by tracking the "idle thread" of the operating system, and examining the costing coefficient for the idle thread, $r_{idle}$. An idle thread is one that executes when there is no work for the resource being measured to do. Assuming that the application/client does not utilize the entire processor/resource (in other words $\rho_{app}<1.0$), if ρidle nears 0, that indicates contention for available processor/resource bandwidth by other applications. Otherwise when ρidle is larger, it indicates a lack of such contention. This information can be made available to the installed handler along with the other costing coefficients.

Using this costing information, the application/client can dynamically vary its operating parameters so as to stay within its permissible bounds of processor/resource bandwidth utilization. The permissible bounds themselves are a policy decision made by the system administration while configuring the application. This feature permits an application to alter its QOS in response to changes in available processor/resource bandwidth. For example, a videoconferencing application can reduce the processor/resource bandwidth requirement of its video codec by a quantifiable amount via frame rate reduction if it detects high contention for available processor bandwidth by other applications.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. An adaptive resource utilization apparatus for an application comprising:
    a costing subsystem engine configured to measure hierarchical resource utilization of subsystems within said application based on resource utilization of threads, wherein information relating to resource utilization of individual threads is provided by an operating system, wherein said threads are hierarchically registered into said subsystems by providing identifying information to associate each thread with one of said subsystems, wherein said hierarchical registering of threads enables said costing subsystem to measure the resource utilization of each respective subsystem of said application based on resource utilization of threads identified as being associated with the respective subsystem; and,
    a feedback mechanism configured to interface said application to said costing engine, said application enabled to modify its operating parameters based on resource utilization of threads and said subsystems as presented to said application by said feedback mechanism, wherein the operation parameter of one subsystem of said application is modifiable independent of the operating parameter of another subsystem.

2. An apparatus according to claim 1 wherein said feedback mechanism presents statistical averages of resource utilization to said application.

3. An apparatus according to claim 1 wherein said costing subsystem is configured to measure cumulative resource utilization of a plurality of threads belonging to a component of said application, and propagate the resource utilization via recursive summation across application specific subsystem hierarchies.

4. An apparatus according to claim 1 wherein said costing subsystem is configured to measure resource utilization by sampling costing coefficients from an operating system that in which said application executes threads.

5. An apparatus according to claim 3 wherein said costing subsystem is configured to identify an entire set of components that belong to an application, the resource utilization of the application the sum of cumulative resource utilizations for all components within the set.

6. An apparatus according to claim 2 wherein said statistical averages include arithmetic means.

7. An apparatus according to claim 2 wherein said statistical averages include standard deviations, said standard deviations enabling said application to distinguish transient conditions of resource utilization from long term trends.

8. An apparatus according to claim 2 wherein said costing subsystem engine is a computer program product.

9. An apparatus according to claim 8 wherein said feedback mechanism is an application programming interface.

10. The apparatus according claim 1, wherein said threads are registered to provide a framework in which said costing engine, said application and operating system are able to communicate costing data.

11. An apparatus according to claim 1, wherein said identifying information associated with each respective thread includes at least one parameter identifying which subsystem the respective thread is associated with.

12. An apparatus according to claim 1, wherein said identifying information associated with each respective thread includes (1) a first parameter identifying a particular subcomponent the respective thread is associated with, and (2) a second parameter identifying a particular subsystem the identified subcomponent is associated with.

13. A method comprising the steps of:
    registering a hierarchical subsystem identification for each thread within a client executing a plurality of threads to associate each thread with one of subsystems of said client, wherein said hierarchical registering of threads enables measurement of the resource utilization of each respective subsystem of said client based on resource utilization of threads identified as being associated with the respective subsystem;
    performing client functions according to a set of operating parameters determining resource utilization by subsystem components based on resource utilization of threads, wherein information relating to resource utilization of individual threads is provided by an operating system; and
    notifying said client of resource utilization by said subsystem components when performing said client functions, said notification enabling said client to modify said set of operating parameters based on resource utilization by said subsystem components.

14. A method according to claim 13 wherein the registering comprises:
    registering a minor component identification for each thread; and
    registering a major component identification for each thread, a major component composed of a set of minor components, and wherein said client is composed of a set of major components.

15. A method according to claim 13 wherein said client is a videoconferencing application.

16. A method according to claim 13 wherein said performing automatically repeats without modification of said set of operating parameters until said notification.

17. A method according to claim 13 further comprising costing resource utilization for each thread by use of a costing coefficient.

18. A method according to claim 13 further comprising calculating time-based statistical measures of resource utilization for each thread prior to notification.

19. A method according to claim 18 wherein the notifying further comprises:
packaging said statistical measures of resource utilization;
organizing said statistical averages and costing coefficients in a hierarchical scheme according to registered component identifications.

20. A method according to claim 17 wherein the costing includes:
initiating a costing interval;
allocating a buffer capable of storing a costing coefficient for each registered thread; and
computing the costing coefficient for each registered thread.

21. A method according to claim 17 wherein the costing further comprises:
identifying the component to which each thread belongs; and
summing the costing coefficient of each thread with costing coefficient total of the identified component.

22. A method according to claim 21 wherein the costing further comprises:
summing the costing coefficient totals for each component of said client into a costing coefficient total for said client.

23. A method according to claim 13 wherein the costing is executed repeatedly until said client entirely ceases execution.

24. A method according to claim 13, wherein said identifying information associated with each respective thread includes at least one parameter identifying which subsystem the respective thread is associated with.

25. A method according to claim 13, wherein said identifying information associated with each respective thread includes (1) a first parameter identifying a particular subcomponent the respective thread is associated with, and (2) a second parameter identifying a particular subsystem the identified subcomponent is associated with.

* * * * *